United States Patent
Sarraf et al.

(10) Patent No.: US 6,842,421 B1
(45) Date of Patent: Jan. 11, 2005

(54) METHOD AND APPARATUS FOR POST-DETECTION MAXIMUM RATIO COMBINING WITH ANTENNA DIVERSITY IN AN ORTHOGONAL FREQUENCY DIVISION MULTIPLEXING (OFDM) COMMUNICATION SYSTEM

(75) Inventors: Mohsen Sarraf, Rumson, NJ (US); Mohammad Hossein Zarrabizadeh, Woodbridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/398,500

(22) Filed: Sep. 17, 1999

(51) Int. Cl.[7] ................................................ H04J 11/00

(52) U.S. Cl. ........................ 370/208; 455/66; 455/273

(58) Field of Search ................................ 370/204, 205, 370/208, 210, 281, 344, 436, 478, 480, 481; 455/66, 143, 137, 192.1, 273, 275

(56) References Cited

U.S. PATENT DOCUMENTS

| | | | | |
|---|---|---|---|---|
| 6,151,372 A | * | 11/2000 | Yamamoto | ................ 375/347 |
| 6,442,211 B1 | | 8/2002 | Hampel et al. | |
| 6,442,222 B1 | * | 8/2002 | Ghazi-Moghadam et al. | ......................... 375/347 |
| 6,487,252 B1 | * | 11/2002 | Kleider et al. | ............... 375/260 |

* cited by examiner

Primary Examiner—Chau Nguyen
Assistant Examiner—Duc Duong

(57) ABSTRACT

A novel antenna diversity technique for OFDM receivers is disclosed. A method and apparatus are disclosed for combining in the frequency domain the various signals received on each of the multiple antennas in an OFDM communication system. At the OFDM transmitter, the transmitted signal is differentially encoded over frequency, as opposed to time, to differentially encode the transmitted signal in the frequency domain with respect to consecutive bins (OFDM sub-carriers). The OFDM receiver processes a signal received on a number of diversity branches and combines the received signals using a post-detection combining technique after differential decoding. Each frame is independently processed by a differential decoder and then delayed to align each symbol in a given frame. The post-detection combining of the frame data inherently scales the received samples and thereby implements an optimal maximum ratio combining mechanism. Unlike conventional maximum ratio combining techniques, the faded bins are scaled individually by the differential decoder, based on their own power levels rather than the overall power of the OFDM frame. Thus, bins with higher magnitudes will be weighted more heavily than bins having severe channel fading.

18 Claims, 1 Drawing Sheet

METHOD AND APPARATUS FOR POST-DETECTION MAXIMUM RATIO COMBINING WITH ANTENNA DIVERSITY IN AN ORTHOGONAL FREQUENCY DIVISION MULTIPLEXING (OFDM) COMMUNICATION SYSTEM

FIELD OF THE INVENTION

The present invention relates generally to antenna diversity techniques, and more particularly, to a method and apparatus for combining in the frequency domain the various signals received on a plurality of antennas in an OFDM communication system.

BACKGROUND OF THE INVENTION

A number of techniques have been proposed or suggested for improving the speed and accuracy of digital communications. In particular, a number of techniques have been developed to compensate for the distortion present in many digital communications channels. For example, a number of techniques have been developed to compensate for multi-path fading, whereby multiple copies of an information signal reach the receiver over multiple paths with different time delays, amplitudes, and phases due to scattering and reflection. As the multiple copies of the information signal destructively interfere with each other, the level of the received signal falls. For a detailed discussion of such multi-path fading compensation techniques, see, for example, Turin, G. L. et al. "On Optimal Diversity Reception," IRE Trans. Inform. Theory, vol. IT-7, pp. 154–166, July 1961, incorporated by reference herein. Generally, if the multi-path fading causes the signal-to-noise ratio (SNR) of the received signal to fall below a usable threshold level, the channel is said to be in a deep fade. For channels with slow fading characteristics, namely, channels whose characteristics vary slowly relative to the data transmission rate, a deep fade can result in long bursts of bit errors.

Antenna diversity is often used to reduce the effects of multi-path fading on channels with slow fading characteristics. The various signals received on each of the multiple antennas can be combined using various techniques, including equal gain combining, maximum ratio combining or by selection diversity techniques. Equal gain combining techniques add each received signal. Maximum ration combining techniques weight each received signal based on a measured power level, thereby emphasizing the stronger signal, before adding each scaled signal. Selection diversity techniques compare the received signal strength from each antenna and select one received signal for processing.

While conventional antenna diversity techniques generally contemplate combining the various received signals in the time domain, it is the frequency response of the original signal that is physically transmitted to the receiver in an orthogonal frequency division multiplexing (OFDM) communication scheme. Thus, combining the diversity branches in the frequency domain will have a different effect on the original data stream than the impact of standard diversity techniques. A need therefore exists for a method and apparatus for combining in the frequency domain the various signals received on each of the multiple antennas in an OFDM communication system.

SUMMARY OF THE INVENTION

Generally, a method and apparatus are disclosed for combining in the frequency domain the various signals received on each of the multiple antennas in an OFDM communication system. At the OFDM transmitter, the transmitted signal is differentially encoded over frequency, as opposed to time, to differentially encode the transmitted signal in the frequency domain with respect to consecutive bins (OFDM sub-carriers).

According to one aspect of the invention, the OFDM receiver processes a signal received on a number of diversity branches and combines the received signals using a post-detection combining technique after differential decoding. In a serial receiver implementation, an FFT block in the OFDM receiver alternately processes a buffered frame of data from each diversity path. Thus, the FFT must switch between the two frames and operate at twice the speed of a conventional OFDM receiver. In a parallel receiver implementation, a pair of FFT blocks in the OFDM receiver each process frame data from a corresponding diversity path.

In an illustrative two-antenna implementation, each frame from a first antenna is immediately followed by the same frame of data as received from a second antenna. Each frame is independently processed by a differential decoder and is then time delayed to align each corresponding symbol in a given frame. Since the received signal has been differentially decoded over frequency by the OFDM transmitter, the differential decoder looks at each bin (OFDM sub-carrier) and multiplies each bin by the value of the subsequent bin.

Thus, according to another aspect of the invention, the post-detection combining of the frame data inherently scales the received samples implement a sub-optimal maximum ratio combining mechanism utilizing differential encoding. Unlike conventional maximum ratio combining techniques, the faded bins are scaled individually by the differential decoder, based on their own power levels rather than the overall power of the OFDM frame. Thus, bins with higher magnitudes will be weighted more heavily than bins having severe channel fading.

A more complete understanding of the present invention, as well as further features and advantages of the present invention, will be obtained by reference to the following detailed description and drawings.

DETAILED DESCRIPTION

Figure 1:
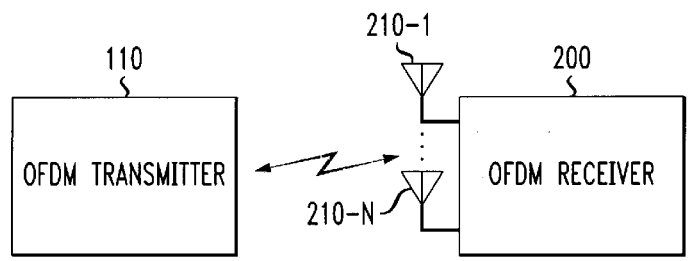
FIG. 1 illustrates an orthogonal frequency division multiplexing (OFDM) communication system where the present invention can operate.

FIG. 1 illustrates an orthogonal frequency division multiplexing (OFDM) communication system 100 where the present invention can operate. As shown in FIG. 1, the OFDM communication system 100 includes an OFDM transmitter 110 and an OFDM receiver 200 in accordance with the present invention, discussed further below in conjunction with FIG. 2. The OFDM receiver 200 includes a plurality of antennas 210-1 through 210-N for achieving antenna diversity, in a known manner.

The OFDM transmitter 110 can be embodied as a conventional OFDM transmitter, as modified herein to incorporate features and functions of the present invention. For a detailed discussion of a conventional orthogonal frequency division multiplexing (OFDM) system, see, for example, W. Y. Zou and Y. Wu, "COFDM—An Overview," IEEE Trans. Broadcasting, Vol. 41, No. 1, 1–8 (March 1995) or J. A. C.

Bingham, "Multicarrier Modulation for Data Transmission: An Idea Whose Time Has Come," IEEE Comm., 5–14 (May 1990), each incorporated by reference herein.

According to one aspect of the present invention, the OFDM transmitter 110 differentially encodes the transmitted signal over frequency, and not time. Thus, the differential encoding is performed with respect to consecutive bins in order to avoid channel phase distortion. For a more detailed discussion of an OFDM transmitter that performs differential encoding of the transmitted signal over frequency, and not time, see United States patent application Ser. No. 09/398,502 entitled "Method and Apparatus for Performing Differential Modulation Over Frequency in an Orthogonal Frequency Division Multiplexing (OFDM) Communication System" filed contemporaneously herewith and incorporated by reference herein.

According to one feature of the present invention, the OFDM receiver 200, discussed further below in conjunction with FIG. 2, processes a signal received on a number of diversity branches and combines the received signals after differential decoding. The channel frequency responses associated with each diversity branch are assumed to be uncorrelated. According to another feature of the present invention, the post-detection combining of the frame data in accordance with the present invention inherently scales the received samples and thereby implements a sub-optimal maximum ratio combining mechanism. The faded bins are scaled individually by the differential decoder 250, based on their own levels rather than the overall power of the OFDM frame, as with conventional techniques. As discussed below, a differential decoder in the OFDM receiver 200 weights each bin, $b_k$, by itself (in the expression $b_k^2$). Thus, bins with higher magnitudes will be weighted more heavily than bins having severe channel fading.

Figure 2:
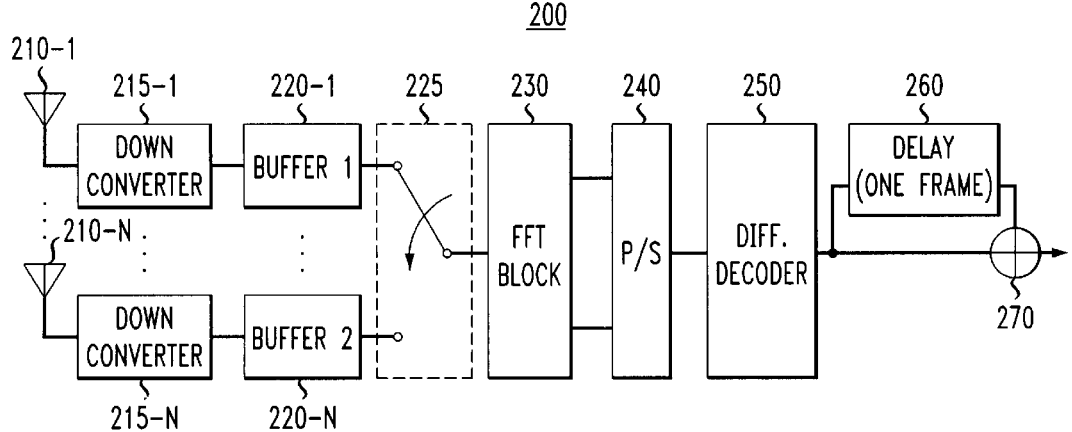
FIG. 2 is a schematic block diagram of an OFDM receiver in accordance with the present invention.

FIG. 2 is a schematic block diagram of an OFDM receiver in accordance with the present invention. As shown in FIG. 2, the OFDM receiver 200 includes a plurality of antennas 210-1 through 210-N (hereinafter, collectively referred to as antennas 210), to implement an antenna diversity scheme. In the illustrative embodiment, the OFDM receiver 200 includes two antennas 210. After the RF signals have been down-converted to a base-band frequency at blocks 215, a frame of data from each received signal is buffered by buffers 220, to permit a serial implementation of the FFT in the receiver 200.

A switch 225 successively passes a frame of data from each received signal to the FFT block 230. The FFT block 230 performs an FFT transform, in a well-known manner. In the illustrative serial implementation, where the FFT alternately processes a frame from each diversity path, the FFT 230 must switch between the two frames and operate at twice the speed of a conventional OFDM receiver. After the data has been serialized by a parallel-to-serial converter 240, the net signal at the output of the FFT block 230 for the two consecutive frames, associated with the two antennas 210, can be expressed as follows:

$$Y_1(k)=H_1(k) \cdot X(k)$$

$$Y_2(k)=H_2(k)X(k)$$

where $H_1(k)$ and $H_2(k)$ are the N point fast fourier transforms (FFT) of the two channel impulse responses associated with the two diversity branches; X(k) is the N point fast fourier transform (FFT) of the x(n), the discrete low-pass equivalent of the transmitted signal; and Y(k) is the signal at the output of the FFT block 230 that corresponds to the original transmitted symbols. From the above equations, it can be seen that the complex samples of the two channel frequency responses $(H_1(k)+H_2(k))$ are added non-coherently, and the net complex value modulates the transmitted symbol at each bin (sub-carrier).

Thus, the output of the parallel-to-serial converter 240 is successive frames from each of the diversity paths. Thus, in the illustrative two-antenna implementation, each frame from antenna 210-1 is immediately followed by the same frame of data as received from antenna 210-2. Each frame is processed by the differential decoder 250 independently, symbol by symbol.

Since the received signal has been differentially decoded over frequency by the OFDM transmitter 110, the differential decoder 250 looks at each bin (sub-carrier) and multiplies each bin by the value of the subsequent bin. In other words, the operation of the differential decoder 250 can be expressed as follows:

$$Z_1(k)=Y_1(k) \cdot Y_1(k-1)=H_1(k)X(k) \cdot H_1(k-1)X(k-1) \approx |H_1(k)|^2 X(k)X(k-1),$$

and $$Z_2(k)=Y_2(k) \cdot Y_2(k-1)=H_2(k)X(k) \cdot H_2(k-1)X(k-1) \approx |H_2(k)|^2 X(k)X(k-1)$$

by combining the two diversity branches, and considering the above approximation due to channel coherence bandwidths much larger than the bin separation, one can arrive at:

$$Z(k)=Z_1(k)+Z_2(k)=(|H_1(k)|^2+|H_2(k)|^2)X(k)X(k-1)$$

which represents the maximum ratio combining of the two diversity branches.

For low inter-bin frequencies (Δf), the magnitude of $b_k$ is almost identical to $b_{k-1}$ and the above expressions can be approximated as $(b_k)^2$.

In order to align the signals received from each of the two antennas 210, the OFDM receiver 200 includes a delay stage 260 that delays the transformed data by one frame (512 samples in the illustrative embodiment).

Thereafter, the corresponding frame data as received by each antenna is summed by an adder 270.

Maximum Ratio Combining Concepts

As previously indicated, the post-detection combining of the frame data in accordance with the present invention inherently scales the received samples and thereby implements an optimal maximum ratio combining mechanism. The faded bins are scaled individually by the differential decoder 250, based on their own levels rather than the overall power of the OFDM frame, as with conventional techniques. The differential decoder 250 weights each bin, $b_k$, by itself (in the expression $b_k^2$). Thus, bins with higher magnitudes will be weighted more heavily than bins having severe channel fading.

It is noted that under flat fading conditions, the two diversity branches can be combined either before or after the demodulation at the FFT block 230. Under coherent demodulation, the two combining schemes are equivalent due to the linearity of the FFT operation. With differential detection at the receiver side, however, the post-combining algorithm discussed herein is optimal due to the inherent scaling of the received signal by the differential decoder 250. It is further noted that that under "selective fading" conditions, as opposed to the flat fading conditions mentioned above, no maximum ratio combining scheme can be applied before the FFT operation.

It is to be understood that the embodiments and variations shown and described herein are merely illustrative of the principles of this invention and that various modifications may be implemented by those skilled in the art without departing from the scope and spirit of the invention. For example, a parallel implementation of the OFDM receiver 200 can be utilized, as would be apparent to a person of the art. In a parallel implementation of the OFDM receiver 200, a pair of FFTs 230 process each received signal in parallel, and the buffers 220 shown in FIG. 2 are not required.

We claim:

1. A method of processing a received signal in an orthogonal frequency division multiplexing (OFDM) communication system, comprising the steps of:
    receiving a plurality of OFDM signals, each of said plurality of OFDM signals received on one of a plurality of antennas;
    processing sub-carriers in each of said OFDM signals to transform said OFDM signals;
    differentially decoding each of said OFDM signals in the frequency domain;
    delaying at least one of said decoded OFDM signals to align corresponding symbols from each of said OFDM signals; and
    combining said aligned symbols from each of said OFDM signals.

2. The method of claim 1, wherein said differentially decoding step weights each sub-carrier value with itself.

3. The method of claim 1, wherein said combining step implements a maximum ratio combining technique.

4. The method of claim 3, wherein said maximum ratio combining technique combines said plurality of aligned symbols as follows:

$$Z(k)=Z_1(k)+Z_2(k)=(|H_1(k)|^2+|H_2(k)|^2).X(k).X(k-1).$$

5. The method of claim 1, wherein said processing step processes said frames in a serial manner and said method further comprises the step of buffering a frame of data from each of said OFDM signals.

6. The method of claim 1, wherein said processing step processes said frames from each of said antennas in parallel.

7. An orthogonal frequency division multiplexing (OFDM) receiver, comprising:
    a plurality of antennas, each of said plurality of antennas receiving one of a plurality of OFDM signals;
    a fast fourier transformer for processing sub-carriers in each of said OFDM signals;
    a differential decoder for demodulating each of said OFDM signals in the frequency domain;
    a delay stage for aligning corresponding symbols from each of said OFDM signals; and
    an adder for combining said aligned symbols from each of said OFDM signals.

8. The receiver of claim 7, wherein said differential decoder weights each sub-carrier value with itself.

9. The receiver of claim 7, wherein said combining implements a maximum ratio combining technique.

10. The receiver of claim 9, wherein said maximum ratio combining technique combines said plurality of aligned symbols as follows:

$$Z(k)=Z_1(k)+Z_2(k)=(|H_1(k)|^2+|H_2(k)|^2).X(k).X(k-1).$$

11. The receiver of claim 7, wherein said frames are processed by said fast fourier transformer in a serial manner and said receiver further comprises a buffer for storing a frame of data from each of said OFDM signals.

12. The receiver of claim 7, wherein said receiver further comprises a fast fourier transformer corresponding to each of said antennas and each of said OFDM signals are processed by a fast fourier transformer in parallel.

13. An orthogonal frequency division multiplexing (OFDM) receiver, comprising:
    a plurality of antennas, each of said plurality of antennas receiving one of a plurality of OFDM signals;
    means for processing sub-carriers in each of said OFDM signals;
    means for demodulating each of said OFDM signals in the frequency domain;
    means for aligning corresponding symbols from each of said OFDM signals; and
    means for combining said aligned symbols from each of said OFDM signals.

14. The receiver of claim 13, wherein said means for demodulating weights each sub-carrier value with itself.

15. The receiver of claim 13, wherein said means for combining implements a maximum ratio combining technique.

16. The receiver of claim 15, wherein said maximum ratio combining technique combines said plurality of aligned symbols as follows:

$$Z(k)=Z_1(k)+Z_2(k)=(|H_1(k)|^2+|H_2(k)|^2).X(k).X(k-1).$$

17. The receiver of claim 13, wherein said frames are processed by said means for processing in a serial manner and said receiver further comprises a buffer for storing a frame of data from each of said OFDM signals.

18. The receiver of claim 13, wherein said receiver further comprises said means for processing corresponding to each of said antennas and each of said OFDM signals are processed by a means for processing in parallel.

* * * * *

UNITED STATES PATENT AND TRADEMARK OFFICE
CERTIFICATE OF CORRECTION

PATENT NO. : 6,842,421 B1 Page 1 of 1
APPLICATION NO. : 09/398500
DATED : January 11, 2005
INVENTOR(S) : Sarraf et al.

It is certified that error appears in the above-identified patent and that said Letters Patent is hereby corrected as shown below:

"References Cited" (Item 56) insert the following 5 U.S. Patent Documents:
On Title Page (Item 56)
-- 5,528,581      6/1996      De Bot --
-- 5,757,766      5/1998      Sugita --
-- 6,141,393      10/2000     Thomas et al. --
-- 6,169,768 B1   1/2001      Okada et al. --
-- 6,175,550 B1   1/2001      van Nee --.

Signed and Sealed this

Fifteenth Day of January, 2008

JON W. DUDAS
*Director of the United States Patent and Trademark Office*